US010895366B2

(12) United States Patent
Guo et al.

(10) Patent No.: US 10,895,366 B2
(45) Date of Patent: Jan. 19, 2021

(54) LIGHT SOURCE SYSTEM AND ADJUSTING METHOD THEREFOR

(71) Applicant: YLX INCORPORATED, Shenzhen (CN)

(72) Inventors: Zuqiang Guo, Shenzhen (CN); Jianpei Jin, Shenzhen (CN); Yi Li, Shenzhen (CN)

(73) Assignee: YLX INCORPORATED, Shenzhen (CN)

( * ) Notice: Subject to any disclaimer, the term of this patent is extended or adjusted under 35 U.S.C. 154(b) by 0 days.

(21) Appl. No.: 16/346,280

(22) PCT Filed: Jun. 16, 2017

(86) PCT No.: PCT/CN2017/088620
§ 371 (c)(1),
(2) Date: May 30, 2019

(87) PCT Pub. No.: WO2018/082311
PCT Pub. Date: May 11, 2018

(65) Prior Publication Data
US 2020/0248892 A1      Aug. 6, 2020

(30) Foreign Application Priority Data
Nov. 1, 2016    (CN) .......................... 2016 1 0942111

(51) Int. Cl.
*F21V 13/14*        (2006.01)
*F21V 14/06*        (2006.01)
(Continued)

(52) U.S. Cl.
CPC .............. *F21V 13/14* (2013.01); *F21V 5/008* (2013.01); *F21V 7/0025* (2013.01); *F21V 9/35* (2018.02); *F21V 14/06* (2013.01); *F21W 2131/406* (2013.01)

(58) Field of Classification Search
CPC ........ F21V 13/14; F21V 7/0025; F21V 5/008; F21V 9/35; F21V 14/06; F21W 2131/406
See application file for complete search history.

(56) References Cited

U.S. PATENT DOCUMENTS

| | | | |
|---|---|---|---|
| 6,939,012 B2* | 9/2005 | Cok | H04N 9/3129 348/E9.026 |
| 2008/0259284 A1* | 10/2008 | Maeda | G03B 21/2066 353/31 |
| 2013/0146932 A1* | 6/2013 | McDaniel, Jr. | G03B 21/208 257/99 |

FOREIGN PATENT DOCUMENTS

| | | |
|---|---|---|
| CN | 103913937 A | 7/2014 |
| CN | 204374524 U | 6/2015 |

(Continued)

OTHER PUBLICATIONS

CN205353549 U Machine Translation (Year: 2016).*
(Continued)

*Primary Examiner* — Tracie Y Green
(74) *Attorney, Agent, or Firm* — Marshall, Gerstein & Borun LLP

(57) ABSTRACT

A light source system includes a laser light source, a transflective optical component, a set of first lenses, a scattering surface, a set of second lenses, an excited light generator, a relay lens, an aperture, and a lens. The laser light source generates light in the first wavelength range irradiating onto the transflective optical component. The transflective optical component reflects a part of the light in the first wavelength range to form first light and transmits a part of the light in the first wavelength range to form second light. The scattered light formed by the first light being scattered on the scattering surface is of uniformly distributed light intensity and converges with the light in the second wavelength range generated by the excited light generator (Continued)

under excitation of the second light to form output light, which is of uniform brightness. A light source adjusting method is further provided.

9 Claims, 3 Drawing Sheets

(51) Int. Cl.
*F21V 5/00* (2018.01)
*F21V 7/00* (2006.01)
*F21V 9/35* (2018.01)
F21W 131/406 (2006.01)

(56) References Cited

FOREIGN PATENT DOCUMENTS

| CN | 105278226 A | | 1/2016 |
|---|---|---|---|
| CN | 105319819 A | | 2/2016 |
| CN | 205353549 U | * | 6/2016 |

OTHER PUBLICATIONS

International Search Report for International Application PCT/CN2017/088620, dated Sep. 12, 2017.
Written Opinion for International Application No. PCT/CN2017/088620, dated Sep. 12, 2017.
European Search Report for Application No. 17867131.9, dated Oct. 18, 2019.

* cited by examiner

LIGHT SOURCE SYSTEM AND ADJUSTING METHOD THEREFOR

CROSS-REFERENCE TO RELATED APPLICATIONS

This is the United States national phase of International Patent Application No. PCT/CN2017/088620, filed Jun. 16, 2017, which claims priority to Chinese Patent Application No. CN 201610942111.3, filed on Nov. 1, 2016, the entire contents of each of which are hereby incorporated by reference.

TECHNICAL FIELD

The present disclosure relates to the field of optical technology, and in particular to a light source system. The present disclosure also relates to a light source adjusting method.

BACKGROUND

The traditional stage light source, as shown in FIG. 1, mainly includes an ellipsoid bulb 1 and a collimating lens 2. The light emitted by the ellipsoid bulb 1 converges at one focus while this focus is also a focus for the collimating lens 2, and the light is converted into parallel light after passing through the collimating lens 2 and irradiates onto a far-field screen 3.

SUMMARY

Technical Problem

Although such a light source system has a simple structure, there is a defect that brightness of a light spot formed on the far-field screen is not uniform.

Solution to the Problem

Technical Solution

In view of this, the present disclosure provides a light source system and an adjusting method therefor, forming an emitted light of uniform brightness such that brightness of a light spot formed on a far-field screen is uniform compared to the related art.

To achieve the above object, the present disclosure provides the following technical aspects.

A light source system includes a laser light source, a transflective optical component, a set of first lenses, a scattering surface, a set of second lenses, an excited light generator, a relay lens, an aperture, and a lens The laser light source is configured to emit light in a first wavelength range.

The transflective optical component is located in an optical path of the light in the first wavelength range, is configured to reflect a part of the light in the first wavelength range to form first light, and is configured to transmit a part of the light in the first wavelength range to form second light.

The set of first lenses and the scattering surface are disposed in an optical path of the first light, the first light is guided by the set of first lenses to the scattering surface to form scattered light, and the scattered light is emitted to the set of first lenses and returns to the transflective optical component after being guided by the set of first lenses.

The set of second lenses and the excited light generator are disposed in an optical path of the second light, the second light is guided by the set of second lenses to the excited light generator, which generates light in a second wavelength range under excitation, and the light in the second wavelength range is emitted to the set of second lenses and returns to the transflective optical component after being guided by the set of second lenses.

The scattered light after being transmitted by the transflective optical component and the light in the second wavelength range after being reflected by the transflective optical component converge into a beam of output light, and the output light is sequentially light-shaped by the relay lens, beam-adjusted by the aperture and emitted by the lens onto a far-field screen to form a desired light spot.

Optionally, the set of first lenses is movable within a plane perpendicular to a direction of the optical path of the first light, or/and the set of second lenses is movable within a plane perpendicular to a direction of the optical path of the second light.

Optionally, a distance between the scattering surface and the set of first lenses is adjustable along a direction of the optical path of the first light.

Optionally, a distance between the excited light generator and the set of second lenses is adjustable along a direction of the optical path of the second light.

Optionally, the transflective optical component is movable with a center being in a plane perpendicular to a direction of the optical path of the first light.

Optionally, the light source system further includes a positive lens and a negative lens, the positive lens and the negative lens being sequentially disposed in an optical path between the laser light source and the transflective optical component and configured to perform light-receiving on the light in the first wavelength range emitted by the laser light source.

Optionally, the light source system further includes a mirror disposed between the positive lens and the negative lens and configured to change a direction of the optical path. The light in the first wavelength range generated by the laser light source is incident on the mirror at an incident angle of 45 degrees to form a reflected light, which irradiates onto the transflective optical component at an incident angle of 45 degrees.

Optionally, a distance from the aperture to the lens is adjustable.

A light source adjusting method applied to the above light source system includes:

step S100 of adjusting a distance between the excited light generator and the set of second lenses along a direction of the optical path of the second light, in such a manner that a light spot of the light in the second wavelength range formed on the far-field screen has a minimized radius;

step S101 of adjusting a position of a center of the transflective optical component in a plane perpendicular to a direction of the optical path of the first light or adjusting a position where the light in the first wavelength range is incident on the transflective optical component, in such a manner that a center of the light spot of the light in the second wavelength range coincides with a center of the aperture;

step S102 of adjusting a position of the set of first lenses in a plane perpendicular to the direction of the optical path of the first light, in such a manner that a center of a light spot of the light in the first wavelength range formed on the far-field screen coincides with the center of the light spot of the light in the second wavelength range; and step S103 of adjusting a distance between the scattering surface and the set of first lenses along the direction of the optical path of the first light, in such a manner that the light spot of the light in the first wavelength range completely coincides with the light spot of the light in the second wavelength range.

Optionally, the step S102 specifically includes: adjusting the position of the set of first lenses in the plane perpendicular to the direction of the optical path of the first light until the light spot of the light in the first wavelength range formed on the far-field screen coincides with the light spot of the light in the second wavelength range in a symmetrical distribution, wherein the symmetric distribution means that there is a symmetrically distributed annular light spot of the light in the second wavelength range at an edge of the light spot of the light in the first wavelength range, or there is a symmetrically distributed annular light spot of the light in the first wavelength range at an edge of the light spot of the light in the second wavelength range.

According to the above technical aspect, the light source system provided by the present disclosure includes a laser light source, a transflective optical component, a set of first lenses, a scattering surface, a set of second lenses, an excited light generator, a relay lens, an aperture and a lens. The laser light source generates a light in the first wavelength range irradiating onto the transflective optical component. The transflective optical component reflects a part of the light in the first wavelength range to form first light and transmits a part of the light in the first wavelength range to form second light. The first light is guided by the set of first lenses to the scattering surface to form scattered light, and the scattered light is emitted to the set of first lenses and returns to the transflective optical component after being guided by the set of first lenses. The second light is guided to the excited light generator by the set of second lenses, which generates light in the second wavelength range under excitation, and the light in the second wavelength range is emitted to the set of second lenses and returns to the transflective optical component after being guided by the set of second lenses. The scattered light after being transmitted by the transflective optical component and the light in the second wavelength range after being reflected by the transflective optical component converge into a beam of output light, and the output light is sequentially light-shaped by the relay lens, beam-adjusted by the aperture and emitted by the lens onto a far-field screen to form a desired light spot. The scattered light formed by the first light after passing through the scattering surface is of uniformly distributed light intensity and converges with the light in the second wavelength range to form an output light, and brightness of the output light is cooperatively adjusted by the relay lens and the aperture to be uniform, so as to form a light spot of uniform brightness on the far-field screen. Therefore, the light source system of the present disclosure forms output light of uniform brightness and forms a light spot of uniform brightness on the far-field screen.

Beneficial Effect of the Present Disclosure

Beneficial Effect

With the light source adjusting method of the present disclosure, a light spot formed on the far-field screen by the light source system can be minimized and complete coincidence of the first light and the second light can be achieved, thereby forming a light spot of uniform brightness and pure color.

BRIEF DESCRIPTION OF DRAWINGS

In order to more clearly illustrate the embodiments of the present disclosure or the technical aspects in the related art, the drawings used in the present embodiments or the description of the related art will be briefly described below. Obviously, the drawings in the following description are only some embodiments of the present disclosure, and other drawings can be obtained by those skilled in the art without any creative work.

DESCRIPTION OF EMBODIMENTS

In order to make those skilled in the art better understand the technical aspects in the present disclosure, the technical aspects in the embodiments of the present disclosure will be clearly and completely described in conjunction with the accompanying drawings in the embodiments of the present disclosure. Obviously, the described embodiments are only part of the embodiments of the present disclosure but not all of the embodiments. All other embodiments obtained by those skilled in the art based on the embodiments of the present disclosure without creative efforts shall fall within the scope of the present disclosure.

Figure 1:
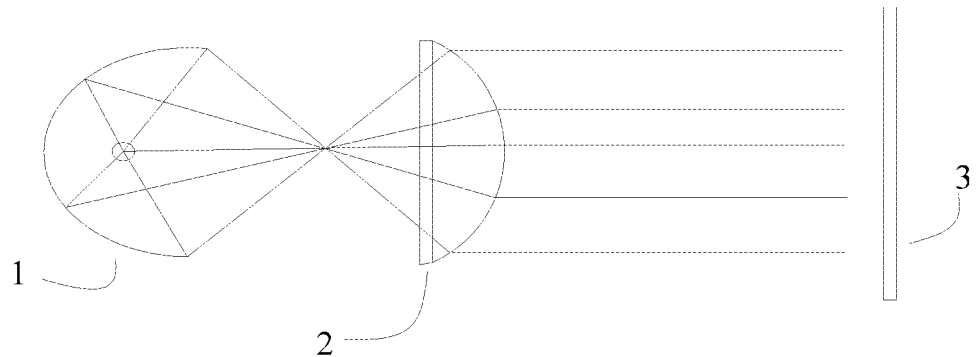
FIG. 1 is a schematic diagram of a light source system in the related art.
Figure 2:
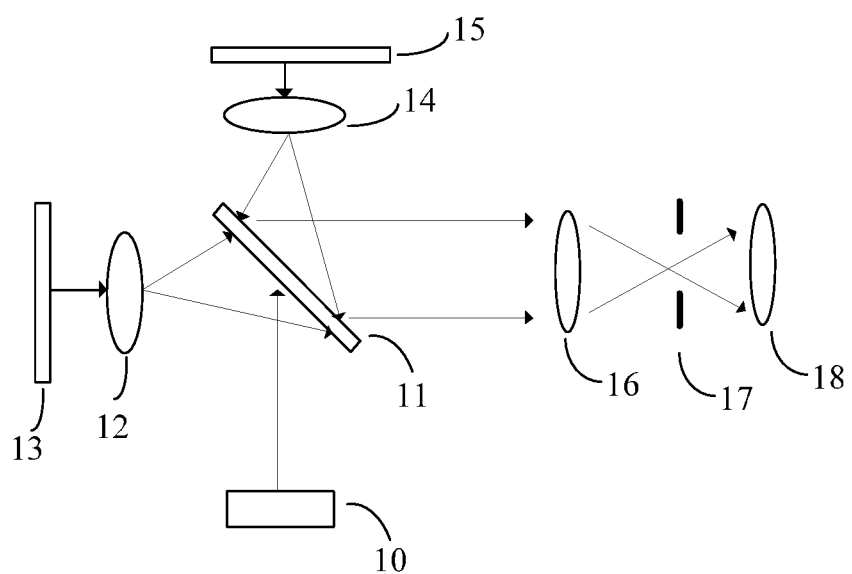
FIG. 2 is a schematic diagram of a light source system according to an embodiment of the present disclosure.

Referring to FIG. 2, which is a schematic diagram of a light source system according to an embodiment of the present disclosure, the light source system includes a laser light source 10, a transflective optical component 11, a set of first lenses 12, a scattering surface 13, a set of second lenses 14, an excited light generator 15, a relay lens 16, an aperture 17 and a lens 18.

The laser light source 10 is configured to emit light in the first wavelength range.

The transflective optical component 11 is located in an optical path of the light in the first wavelength range, reflects a part of the light in the first wavelength range to form first light and transmits a part of the light in the first wavelength range to form second light.

The set of first lenses 12 and the scattering surface 13 are disposed in an optical path of the first light, and the first light is guided to the scattering surface 13 by the set of first lenses 12 to form scattered light. The scattered light is emitted to the set of first lenses 12 and returns to the transflective optical component 11 after being guided by the set of first lenses 12.

The set of second lenses 14 and the excited light generator 15 are disposed in an optical path of the second light, and the second light is guided to the excited light generator 15 by the set of second lenses 14 and the excited light generator 15 generates light in the second wavelength range under excitation. The light in the second wavelength range is emitted to the set of second lenses 14 and returns to the transflective optical component 11 after being guided by the set of second lenses 14.

The scattered light after being transmitted by the transflective optical component 11 and the light in the second wavelength range after being reflected by the transflective optical component 11 converge into a beam of output light. The output light is sequentially light-shaped by the relay lens 16, beam-adjusted by the aperture 17 and emitted by the lens 18 onto a far-field screen to form a desired light spot.

The laser light source 10 generates a laser in the first wavelength range, and the generated laser has concentrated energy and irradiates onto the transflective optical component 11.

The transflective optical component 11 means that as light irradiates onto this transflective optical component, a part of the light is reflected while a part of the light is transmitted. Depending on light in different wavelength ranges, a ratio of the reflected light and the transmitted light is correspondingly different. In the present embodiment, the transflective optical component 11 is transflective to the light in the first wavelength range but reflects most of the light in the second wavelength range.

The set of first lenses 12 and the set of second lenses 14 have a function of light collection and may be a set of collimating lens.

The scattering surface 13 means that light can be scattered when irradiating onto a surface thereof, and the scattering surface 13 may form scattered light of uniform intensity. Preferably, the scattering surface 13 can form Lambertian scattering.

The excited light generator 15 generates light in the second wavelength range under excitation of light in the first wavelength range, and a center wavelength of the light in the second wavelength range is smaller than a center wavelength of the light in the first wavelength range. The output light of the light source system is formed by mixing the light in the first wavelength range and the light in the second wavelength range. A color of the output light is determined by wavelength ranges of the light in the first wavelength range and the light in the second wavelength range.

The light source system of the present embodiment is used for generating white light, and therefore the light in the first wavelength range and the light in the second wavelength range are required to be mixed to form white light. As an option, the light in the first wavelength range is blue light and the light in the second wavelength range is yellow light. The transflective optical component 11 is able to transmit approximately 80% and reflect 20% of the blue light, but reflect more than 99% of the yellow light serving as the light in the second wavelength range. It can be understood that in other embodiments, white light can be obtained by synthesizing light of other wavelength ranges.

The relay lens refers to a lens or a set of lenses disposed in an optical path. These lenses process a beam by convergence, divergence, shaping and the like, such that the beam is projected onto a designated projection surface in accordance with a predetermined light spot size and shape. In the present embodiment, the relay lens 16 is located in an optical path between the transflective optical component 11 and the aperture 17 and shapes the convergent output light.

The aperture 17 is an optical element for controlling how much the beam passes, and intensity of the beam passing through it can be adjusted by the aperture.

In the light source system of the present embodiment, the laser light source 10 generates the light in the first wavelength range irradiating onto the transflective optical component 11. The transflective optical component 11 reflects a part of the light in the first wavelength range to form first light and transmits a part of the light in the first wavelength range to form second light. The scattered light formed by the first light being scattered on the scattering surface 13 is of uniformly distributed light intensity and converges with the light in the second wavelength range generated by the excited light generator under excitation of the second light to form output light, and brightness of the output light is cooperatively adjusted by the relay lens 16 and the aperture 17 to be uniform. Therefore, the light source system of the present embodiment forms output light of uniform brightness, and forms a light spot of uniform brightness on the far-field screen.

In still another embodiment of the light source system, based on the contents of the above embodiments, the set of first lenses 12 is movable within a plane perpendicular to a direction of the optical path of the first light. By adjusting a position of the set of first lenses 12 in a plane perpendicular to the direction of the optical path of the first light, a position of a center of a light spot formed by the scattered light can be adjusted, and it can be adjusted to coincide with a position of a center of a light spot of the light in the second wavelength range.

In another embodiment, the set of second lenses 14 is movable within a plane perpendicular to a direction of the optical path of the second light. By adjusting a position of the set of second lenses 14 in a plane perpendicular to the direction of the optical path of the second light, a position of a center of a light spot formed by the light in the second wavelength range can be adjusted, and it is adjusted to coincide with the position of the center of the light spot formed by the scattered light.

In another embodiment, the set of first lenses 12 is movable within a plane perpendicular to the direction of the optical path of the first light and the set of second lenses 14 is movable within a plane perpendicular to the direction of the optical path of the second light. By adjusting positions of the set of first lenses 12 and the set of second lenses 14 respectively, the light spot formed by the scattered light is adjusted to coincide with the position of the center of the light spot formed by the light in the second wavelength range, so that the light spot of the convergent output light is uniform, thereby avoiding problems such as deviation and dispersion in a light spot.

In each of the above embodiments, a size of the light spot formed by the scattered light can be adjusted by the set of first lenses 12, and the first light is converged to the scattering surface 13 by the set of first lenses 12. A distance between the scattering surface 13 and the set of first lenses 12 can be adjusted along a direction of the optical path of the first light. The size of the light spot formed by the scattered light is adjusted by adjusting the distance between the scattering surface 13 and the set of first lenses 12. Theoretically, the light spot will be minimized when the scattering surface 13 is located at the focus of the set of first lenses 12, however, in practical applications, since there maybe deviations in an error of each assembly of the system, it is possible that the light spot is minimized only when the scattering surface 13 is located near the position of the focus of the set of first lenses 12. Therefore, in practical applications, by observing the light spot formed on the far-field screen, the distance between the scattering surface 13 and the set of first lenses 12 can be adjusted to form a minimum light spot.

In each of the above embodiments, the set of second lenses 14 adjusts the size of the light spot formed by the light in the second wavelength range generated under excitation, and the second light is converged by the set of second lenses 14 to the excited light generator 15. Along a direction of the optical path of the second light, the distance between the excited light generator 15 and the set of second lenses 14 can be adjusted. The size of the light spot formed by the light in the second wavelength range is adjusted by adjusting the distance between the excited light generator 15 and the set of second lenses 14. Theoretically, the light spot formed by the light in the second wavelength range can be minimized when the excited light generator 15 is located at the focus of the set of second lenses 14. However, there may be deviations in practical applications, and it is possible that the light spot is minimized when the excited light generator 15 is located near the focus of the set of second lenses 14. Therefore, in practical applications, the light spot formed may be minimized by observing the light spot formed on the far-field screen while adjusting the distance between the excited light generator and the set of second lenses.

In still another embodiment of the light source system, based on the contents of the above embodiments, the transflective optical component 11 is movable with a center in a plane perpendicular to the direction of the optical path of the first light. By adjusting the position of the center of the transflective optical component 11 in this plane, the position of the center of the light spot of the convergent light can be adjusted so as to coincide with the center of the aperture 17.

In the above embodiments, the converged output light passes through the relay lens 16, which has functions of light-converging and light-shaping. The lens 18 is used to collimate the output light in such a manner that the output light irradiates onto the far-field screen.

In the light source system, the distance between the aperture 17 and the lens 18 can be adjusted. The output light is emitted to the far-field screen after being converged and light shaped by the relay lens 16, beam-adjusted by the aperture 17 and collimated by the lens 18. By adjusting the distance from the aperture 17 to the lens 18, the position of the aperture 17 to the converging point is adjusted, such that the size of the light spot of the output light can be adjusted.

Figure 3:
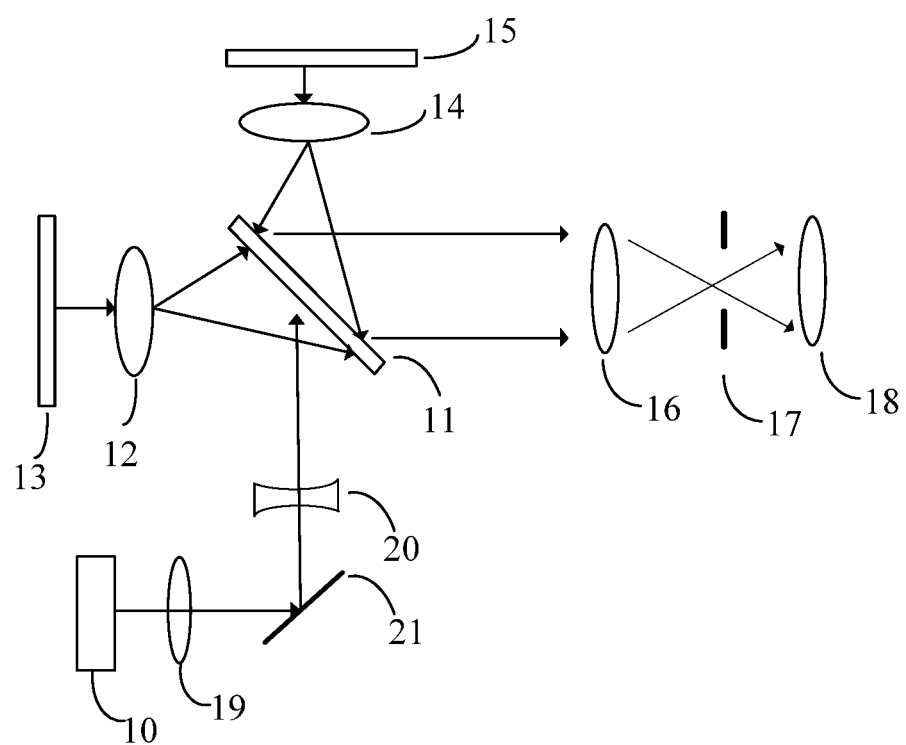
FIG. 3 is a schematic diagram of a light source system according to another embodiment of the present disclosure.

In the above embodiments, referring to FIG. 3, based on the light source system shown in FIG. 2, the light source system may further include a positive lens 19 and a negative lens 20 sequentially disposed in an optical path between the laser light source 10 and the transflective optical component 11 and used for performing light-receiving on the light in the first wavelength range emitted by the laser light source. Light-receiving and adjustment are performed, by the positive lens 19 and the negative lens 20, on the laser generated by the laser light source 10, so that its divergence angle converges.

In practical applications, sometimes it is necessary to change an optical path in order to make the overall structure more compact. In order to meet the optical path design requirements, the light source system further includes a mirror 21 disposed between the positive lens 19 and the negative lens 20 and used for changing a direction of an optical path. The light in the first wavelength range generated by the laser light source is incident on the mirror 21 at an incident angle of 45 degrees and the formed reflected light irradiates onto the transflective optical component 11 at an incident angle of 45 degrees.

In the above embodiments, the excited light generator 15 includes a fluorescent color wheel device, and the transmitted light in the first wavelength range irradiates onto a light-receiving surface of the fluorescent color wheel device to generate the light in the second wavelength range under excitation.

In the present embodiment, the light source system is used to generate white light, and blue band light is selected to be the light in the first wavelength range. The fluorescent color wheel device has a yellow fluorescent surface. The blue band light generated by the laser light source 10 excites the fluorescent color wheel to generate yellow band light, and the yellow band light and the blue band light converge so as to form white output light.

Figure 4:
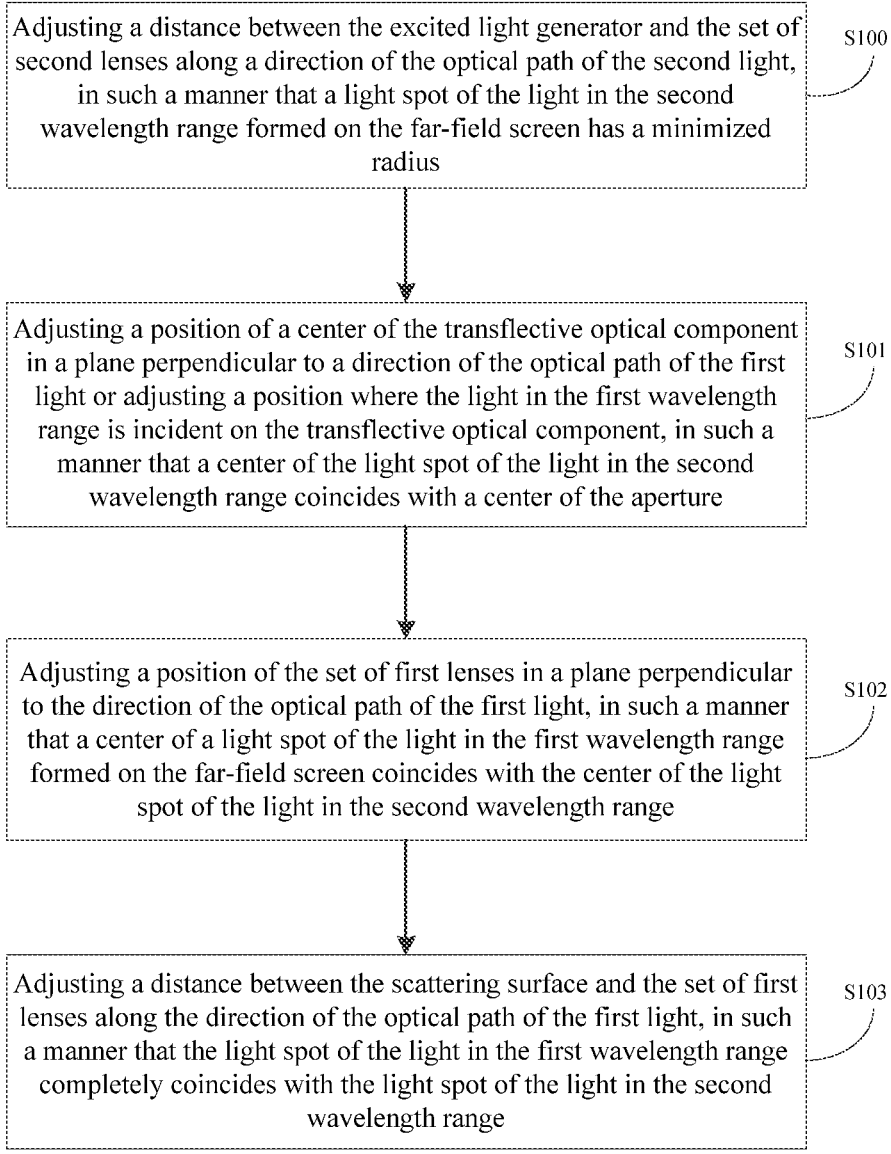
FIG. 4 is a flowchart of a light source adjusting method according to an embodiment of the present disclosure.

Referring to FIG. 4, an embodiment of the present disclosure further provides a light source adjusting method applied to the light source system described above. The method includes Step S100 of adjusting a distance between an excited light generator and a set of second lenses along a direction of an optical path of second light, in such a manner that a light spot of the light in the second wavelength range formed on the far-field screen has a minimized radius.

Theoretically, the light spot can be minimized when the excited light generator 15 is located at the position of the focus of the set of second lenses 14. However, in practical applications, the light spot emitted by the excited light generator 15 may be relatively large, that is, it will diverge somewhat, then it is required to adjust the distance between the excited light generator 15 and the set of second lenses 14. The radius of the light spot may be minimized by observing the size of the light spot of the light in the second wavelength range formed on the far-field screen (the screen is 3-5 meters away from the light source system) while performing the adjusting. The position of the excited light generator 15 may be fixed after being adjusted to the optimum position.

At Step S101, a position of a center of a transflective optical component in a plane perpendicular to a direction of an optical path of first light is adjusted or a position where light in the first wavelength range is incident on a transflective optical component is adjusted, in such a manner that a center of the light spot of the light in the second wavelength range coincides with a center of the aperture.

For the light source system shown in FIG. 2, it is possible to make the center of the light spot of the light in the second wavelength range coincide with the center of the aperture by adjusting the position of the center of the transflective optical component 11 in a plane perpendicular to the direction of the optical path of the first light. For the light source system shown in FIG. 3, the position of the mirror 21 can be adjusted to adjust the position where light in the first wavelength range is incident on a transflective optical component 11, thereby making the center of the light spot of the light in the second wavelength range coincide with the center of the aperture. Making the center of the light spot of the emitted light coincide with the center of the aperture can avoid problems such as deviation and dispersion in a light spot.

At Step S102, a position of the set of first lenses in a plane perpendicular to the direction of the optical path of the first light is adjusted in such a manner that a center of a light spot of the light in the first wavelength range formed on the far-field screen coincides with the center of the light spot of the light in the second wavelength range.

After the position of the transflective optical component 11 is fixed, the center of the light spot of the light in the first wavelength range emitted will also coincide with the center of the aperture theoretically, however, in practical applications, light spots, on the far-field screen, of the two light may not coincide or may shift due to tolerances, assembly and the like reasons. In this case, by adjusting the position of the set of first lenses 12 in a plane perpendicular to the direction of the optical path of the first light, the light spot center of the light in the first wavelength range is caused to coincide with the center of the light spot of the light in the second wavelength range.

The specific adjustment process includes: adjusting a position of the set of first lenses 12 in a plane perpendicular to the direction of the optical path of the first light, until a light spot of the light in the first wavelength range formed on the far-field screen coincides with a light spot of the light in the second wavelength range in a symmetrical distribution, wherein the symmetric distribution means that there is a symmetrically distributed annular light spot of the light in the second wavelength range at an edge of the light spot of the light in the first wavelength range, or there is a symmetrically distributed annular light spot of the light in the first wavelength range at an edge of the light spot of the light in the second wavelength range.

At Step S103, a distance between a scattering surface and the set of first lenses is adjusted along a direction of an optical path of first light, in such a manner that the light spot of the light in the first wavelength range completely coincides with the light spot of the light in the second wavelength range.

After adjusting to make the center of the light spot of the light in the first wavelength range coincide with the center of the light spot of the light in the second wavelength range, the distance between the scattering surface 13 and the set of first lenses 12 may be adjusted along the direction of the optical path of the first light, so as to adjust the size of the light spot of the light in the first wavelength range to completely coincide with the light spot of the light in the second wavelength range.

The light source system of the present embodiment adopts the above adjusting method, and by means of the adjusting, the light source system has a concentrated light beam in the far-field, obtains a minimum light spot and achieves complete coincidence of the first light and the second light. Thus, the formed output light is of uniform brightness and the formed light spot is of uniform brightness and pure color, thereby avoiding problems such as deviation and dispersion in a light spot.

The light source system and the adjusting method therefor provided by the present disclosure have been described in detail above. The principles and embodiments of the present disclosure have been described herein with reference to specific examples, and the description of the above embodiments is only used to assist in understanding the method of the present disclosure and its core idea. It should be noted that those skilled in the art can make various improvements and modifications to the present disclosure without departing from the principles of the present disclosure. These improvements and modifications will also fall within the scope of the claims of the present disclosure.

What is claimed is:

1. A light source system, comprising a laser light source, a transflective optical component, a set of first lenses, a scattering surface, a set of second lenses, an excited light generator, a relay lens, an aperture, and a lens;
   the laser light source is configured to emit light in a first wavelength range;
   the transflective optical component is located in an optical path of the light in the first wavelength range, is configured to reflect a part of the light in the first wavelength range to form first light, and is configured to transmit a part of the light in the first wavelength range to form second light;
   the set of first lenses and the scattering surface are disposed in an optical path of the first light, the first light is guided by the set of first lenses to the scattering surface to form scattered light, and the scattered light is emitted to the set of first lenses and returns to the transflective optical component after being guided by the set of first lenses;
   the set of second lenses and the excited light generator are disposed in an optical path of the second light, the second light is guided by the set of second lenses to the excited light generator, which generates light in a second wavelength range under excitation, and the light in the second wavelength range is emitted to the set of second lenses and returns to the transflective optical component after being guided by the set of second lenses;
   the scattered light after being transmitted by the transflective optical component and the light in the second wavelength range after being reflected by the transflective optical component are combined into a beam of output light to be outputted; and
   the set of first lenses is movable within a plane perpendicular to a direction of the optical path of the first light, or the set of second lenses is movable within a plane perpendicular to a direction of the optical path of the second light, so that a position of a center of a light spot formed by the scattered light or a position of a center of a light spot formed by the light in the second wavelength range can be adjusted, in such a manner that the position of the center of the light spot formed by the scattered light coincides with the position of the center of the light spot formed by the light in the second wavelength range.

2. The light source system according to claim 1, wherein a distance between the scattering surface and the set of first lenses is adjustable along a direction of the optical path of the first light.

3. The light source system according to claim 1, wherein a distance between the excited light generator and the set of second lenses is adjustable along a direction of the optical path of the second light.

4. The light source system according to claim 1, wherein the transflective optical component is movable with a center being in a plane perpendicular to a direction of the optical path of the first light.

5. The light source system according to claim 1, further comprising a positive lens and a negative lens, the positive lens and the negative lens being sequentially disposed in an optical path between the laser light source and the transflective optical component and configured to perform light-receiving on the light in the first wavelength range emitted by the laser light source.

6. The light source system according to claim 5, further comprising a mirror disposed between the positive lens and the negative lens and configured to change a direction of the optical path between the laser light source and the transflective optical component,
   the light in the first wavelength range generated by the laser light source is incident on the mirror at an incident angle of 45 degrees to form a reflected light, which irradiates onto the transflective optical component at an incident angle of 45 degrees.

7. The light source system according to claim 1, wherein a distance from the aperture to the lens is adjustable.

8. A light source adjusting method applied to the light source system according to claim 1, comprising:
   step S100 of adjusting a distance between the excited light generator and the set of second lenses along a direction of the optical path of the second light, in such a manner that a light spot of the light in the second wavelength range formed on the far-field screen has a minimized radius;

step S101 of adjusting a position of a center of the transflective optical component in a plane perpendicular to a direction of the optical path of the first light or adjusting a position where the light in the first wavelength range is incident on the transflective optical component, in such a manner that a center of the light spot of the light in the second wavelength range coincides with a center of the aperture;

step S102 of adjusting a position of the set of first lenses in a plane perpendicular to the direction of the optical path of the first light, in such a manner that a center of a light spot of the light in the first wavelength range formed on the far-field screen coincides with the center of the light spot of the light in the second wavelength range; and step S103 of adjusting a distance between the scattering surface and the set of first lenses along the direction of the optical path of the first light, in such a manner that the light spot of the light in the first wavelength range completely coincides with the light spot of the light in the second wavelength range.

9. The light source adjusting method according to claim 8, wherein the step S102 specifically comprises:

adjusting the position of the set of first lenses in the plane perpendicular to the direction of the optical path of the first light until the light spot of the light in the first wavelength range formed on the far-field screen coincides with the light spot of the light in the second wavelength range in a symmetrical distribution, wherein the symmetric distribution means that there is a symmetrically distributed annular light spot of the light in the second wavelength range at an edge of the light spot of the light in the first wavelength range, or there is a symmetrically distributed annular light spot of the light in the first wavelength range at an edge of the light spot of the light in the second wavelength range.

* * * * *